(No Model.) 3 Sheets—Sheet 1.
M. HARCOURT.
VEHICLE GEAR.
No. 494,332. Patented Mar. 28, 1893.
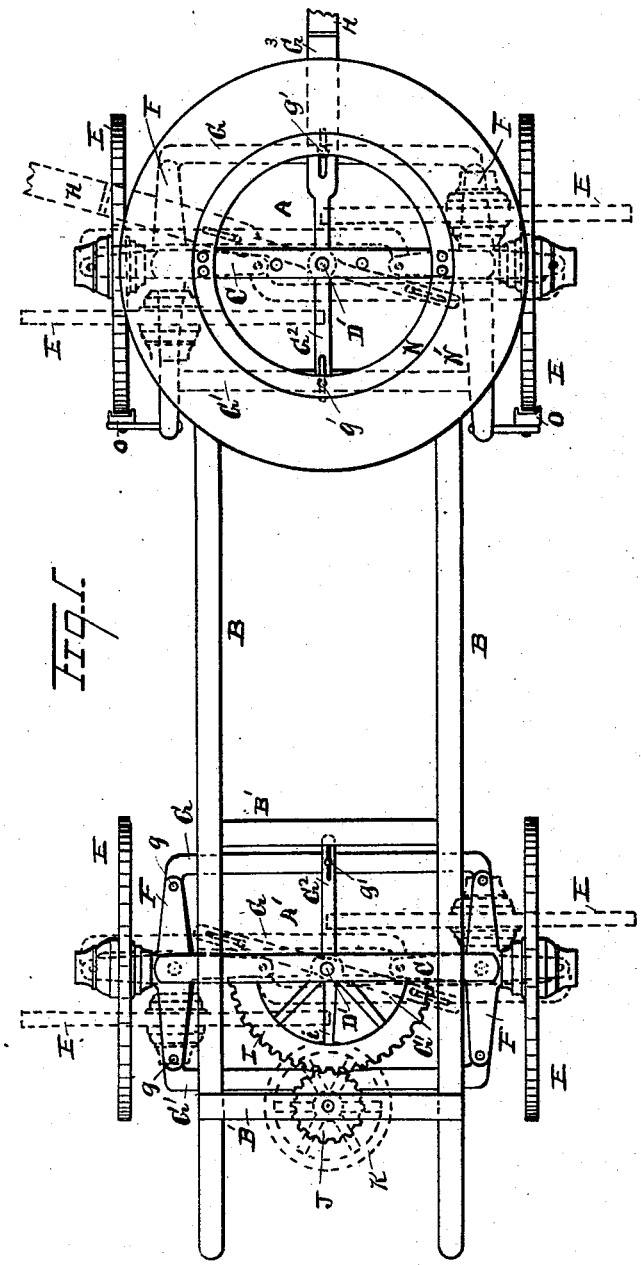
Witnesses
John Schuman.
John F. Miller
Inventor
Matthew Harcourt
By his Attorney
Newell S. Wright

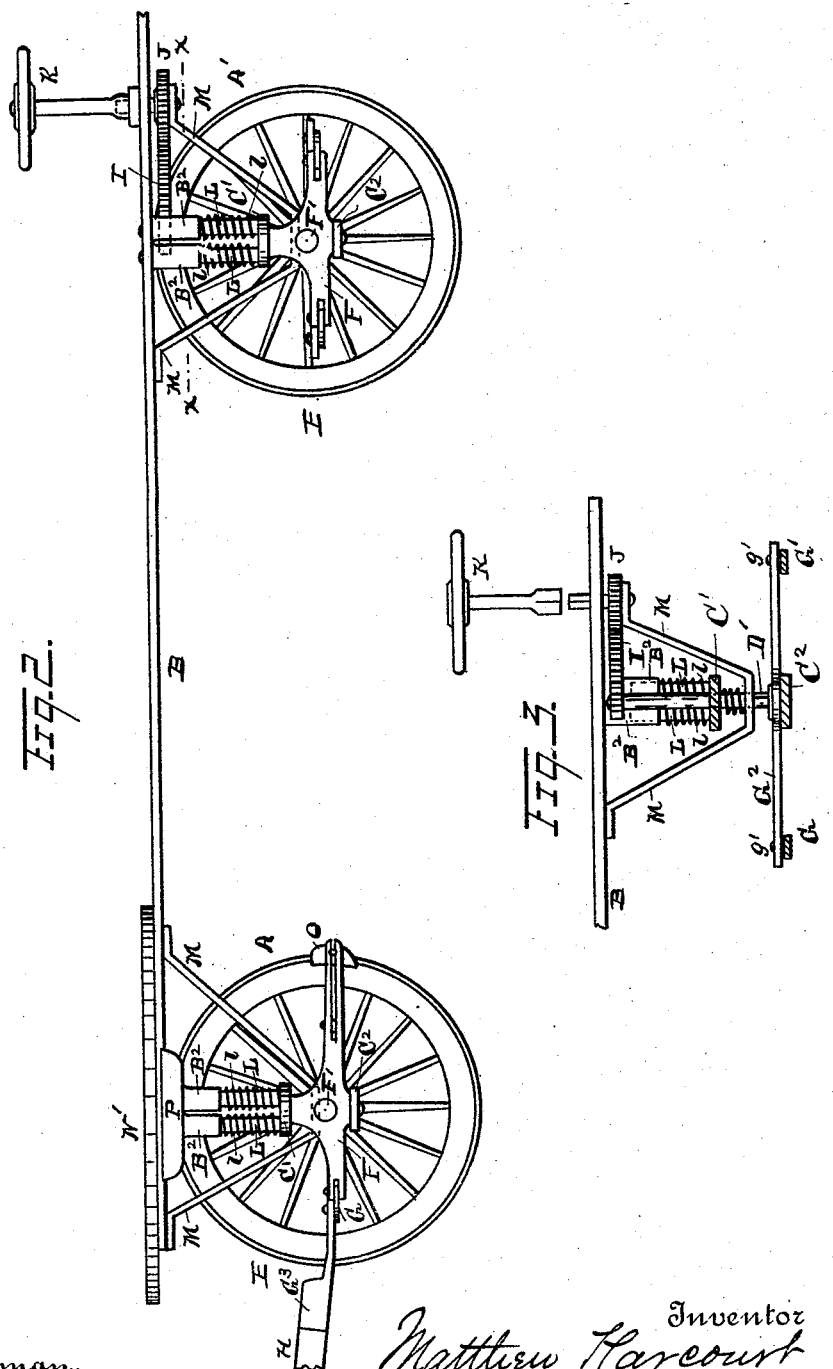

(No Model.) 3 Sheets—Sheet 3.
M. HARCOURT.
VEHICLE GEAR.

No. 494,332. Patented Mar. 28, 1893.

Witnesses
John Schuman.
John F. Miller.

Inventor
Matthew Harcourt
By his Attorney
Newell S. Wright.

UNITED STATES PATENT OFFICE.

MATTHEW HARCOURT, OF DETROIT, MICHIGAN.

VEHICLE-GEAR.

SPECIFICATION forming part of Letters Patent No. 494,332, dated March 28, 1893.

Application filed September 28, 1892. Serial No. 447,158. (No model.)

*To all whom it may concern:*

Be it known that I, MATTHEW HARCOURT, a citizen of the United States, residing at Detroit, county of Wayne, State of Michigan, have invented a certain new and useful Improvement in Vehicle-Gears; and I declare the following to be a full, clear, and exact description of the invention, such as will enable others skilled in the art to which it appertains to make and use the same, reference being had to the accompanying drawings, which form a part of this specification.

My invention pertains to vehicle gears, and relates more particularly to gears for hook and ladder trucks for fire department service.

It has for its objects an improved construction whereby hook and ladder trucks and other vehicles can turn shorter, and more readily, as about street corners, than trucks of such a nature heretofore in use.

It has for its object also, a construction whereby trucks of this class, and other vehicles, can be more readily and conveniently moved laterally or across a street, if necessary. In trucks for this purpose commonly employed, if, when going to a fire, the truck is run upon the wrong side of the street it has often been necessary to run entirely about a block in order to locate the hook and ladder in proper position on the opposite side of the street.

My invention is intended and adapted to overcome such difficulties, and to permit the more rapid, easy and convenient turning and movement of said trucks and vehicles.

To these ends my invention consists of the combinations, constructions and arrangements of devices and appliances hereinafter specified and claimed, and illustrated in the accompanying drawings, in which—

Figure 4:
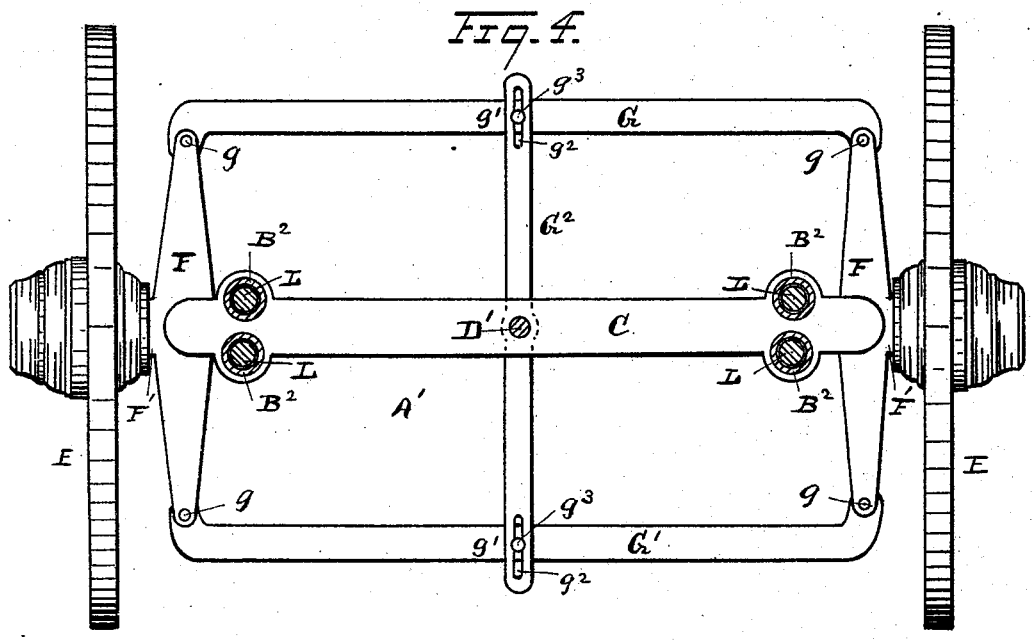
Figure 5:
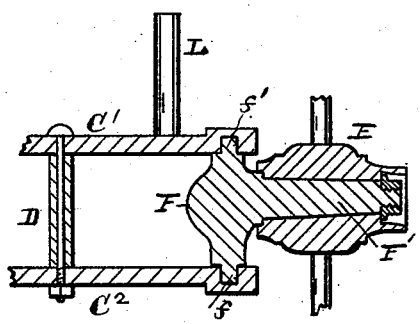

Figure 1 is a plan view embodying my invention. Fig. 2 is a side elevation, the wheels being removed from the front side. Fig. 3 is a detail view, showing parts in section, more clearly showing the steering gear connected with the rear truck. Fig. 4 is a plan view of features of my invention, showing parts in horizontal section on the line $x$—$x$ Fig. 2. Fig. 5 is a detail view in vertical section, showing one of the frames with the evener arm and hub engaged therewith.

The foregoing and other objects of my invention I carry out as follows:—

My improved gear is composed essentially of forward and rear trucks, and a platform supported thereupon and uniting said trucks. Accordingly A and A' denote the forward and rear trucks, which in their main features are constructed in a similar manner. B B is the platform frame supported thereupon and connecting said trucks. Each of the said trucks is constructed with a frame C consisting of upper and lower horizontally extended cross bars C' and C². D represents uprights located between said upper and lower cross bars. The wheels E E of each of the trucks are journaled, respectively, upon a longitudinally extended evener F, constructed with a laterally projecting arm F' intermediate its extremities, upon which the wheel is engaged intermediate the ends of said evener. Also it is provided with vertically extended journals "$f$" and "$f'$," shown in Fig. 5, having their bearings in the adjacent ends of the upper and lower cross bars C' and C² of the frame C. As so constructed and arranged, it will be seen, the ends of said eveners are free to oscillate horizontally, either to the right or to the left and thereby carry the wheels in a corresponding direction. The front and rear extremities of the two eveners respectively are united by connecting bars G and G' having a jointed engagement with said eveners at each end, as shown at "$g$." As so connected both of the eveners of a truck are oscillated in the same direction simultaneously. It will also be perceived that when either end of the two eveners is thrown outward in their oscillation, the opposite ends thereof are thrown inward, and the construction is such as to permit their being thrown inward between the upper and lower cross pieces C' and C². Thus, as shown in dotted lines in Fig. 1, the eveners may be thrown or oscillated about parallel to and longitudinal with the cross pieces C' and C², thereby carrying the corresponding wheels into a position, completely at right angles to their normal position, shown in full lines in Fig. 1. By such a construction it is evident, that if a hook and ladder truck be run into position shown in full lines in Fig. 1, and it is desired to move it across the street, the trucks can be readily turned at right angles, both at front and rear, as shown in dotted lines Fig. 1, so as to permit the movement of the platform, carrying the hook and ladder, laterally, straight across the street, if desired, without turning the device around, as has heretofore been necessary. The connecting bars G and G' are also preferably connected intermediate their ends by a steering cross bar G² having a jointed engagement therewith, as shown at "g'," the cross bar G² being constructed at its ends with elongated slots "g²" receiving a connecting pin "g³." Intermediate its ends said cross bar is also engaged upon a rotatable post D' located between the upper and lower bars C', C² of the frame C. At the forward end in the forward truck the cross bar G² is extended as shown at G³ to form connection with the tongue H.

On the rear truck the post D' is extended above the frame C and toward its upper end is provided with a segmental gear I engaged therewith, as by connecting spokes "i." A pinion J operated by a hand wheel K meshes with the segmental gear I. It will thus be observed that by the tongue connected with the cross bar G² on the forward truck the cross bars G and G' of said truck may be thrown laterally in either direction, carrying with them the connected eveners, to throw the wheels into any desired position, either at full right angles to their position shown in full lines Fig. 1, or at any desired intermediate angle. The two bars G and G' of course move in opposite directions. The bars G and G' of the rear trucks are correspondingly steered or shifted by means of the hand wheel K geared with the post D' connected to the corresponding bars G and G'.

The platform frame B B is connected by suitable cross braces B', and is supported at the front and rear upon the frames C of both the forward and rear trucks by upwardly projecting posts L L, having a fixed engagement with the frame C, but preferably a rotatable engagement with the frame B. To this end the frame B is provided with sockets B² to receive the upper ends of the posts L L. This construction permits the shifting of the trucks in any desired direction without correspondingly shifting the frame or platform.

The posts L L are provided with springs "l" acting upon the lower ends of the sockets B² with an upward pressure. The upper ends of said posts normally enter said sockets only to a limited extent, the sockets being of sufficient depth to allow a compression of the springs to a required degree. Depending braces M, at the front and rear, connect the platform frame with the frame C, for strength and firmness.

The forward end of the platform frame is provided with the ordinary rotary turn-table circle irons N and N'. These irons may be of the ordinary construction, with the ladders secured thereto, which are not shown as they may be of any ordinary construction, and occupy a recumbent position and extend rearward from the platform or turn-table.

As shown in Figs. 1 and 2 the eveners F on the forward trucks may be extended rearwardly to support a brake shoe O in a convenient and inexpensive manner. The platform frame may also be provided with locking bars P, to engage and lock the wheels when in the position shown in dotted lines Fig. 1, and when the ladders are in their recumbent position a large portion of their heft or weight comes upon the rear end of the wagon, but when they are elevated the weight is shifted to the front end of the wagon which causes the springs upon the posts L to be compressed which will cause the locking bars P to come into engagement with the tires of the wheels which have been turned in under the side of the wagon before the elevation of the ladders.

It will be seen that my improved gear dispenses with the ordinary axles altogether, and also with a reach. It will also be evident from an inspection of the position of the wheels shown in dotted lines Fig. 1, that all liability of tipping over, in going swiftly about a corner or curve is effectually overcome, since one of the wheels of each truck is always advancing forward of the other, and so carries the weight forward therewith, overcoming all danger from centrifugal force in making a turn, however short or rapidly it may be done.

It will be seen that the connecting bars G, G' and the cross bar G² are in the nature of jointed lever connections exerting a leverage upon the parts with which they are connected when power is applied thereto, either by the tongue in the forward truck, or by the hand wheel in the rear truck.

I would have it understood that I do not limit myself solely to the particular construction of the frame C hereinbefore described, as any suitable device supporting and connecting the wheels in which the eveners F may be journaled I contemplate as coming within the scope of my invention.

What I claim as my invention is—

1. In a vehicle gear, the combination, with a pair of trucks, each having wheels pivotally secured at its ends adapted to be turned parallel with the length of the trucks, and a frame secured to the truck above the top of the wheels, substantially as set forth.

2. In a vehicle gear, the combination, with a pair of trucks, each having wheels pivotally secured at its ends and adapted to be turned parallel with the length of the trucks, said trucks also being provided with posts, and a frame upon the posts above the top of the wheels, substantially as set forth.

3. In a vehicle gear, the combination, with a pair of trucks, each of which comprises an upper and a lower cross-bar, uprights bolted between said cross-bars, a wheel journaled at the outer end of each of said trucks, and a frame secured to the trucks, and connecting them together, substantially as set forth.

4. In a vehicle gear, the combination, with a pair of trucks, each of which comprises an upper and a lower cross-bar, an evener secured in the ends of said bars, one end of each of the eveners in the front truck being extended and provided with a brake shoe, a wheel upon each evener, and a frame secured to the trucks for connecting them together, substantially as set forth.

5. In a vehicle gear, the combination, with a pair of trucks, the outer end of each of which is provided with wheels pivotally secured thereto, and adapted to be turned parallel with the length of the trucks, a spring supported frame secured to the trucks above the top of the wheels, the under side of the front end of which frame is provided with stop blocks, adapted to be forced into engagement with the wheels after said wheels have been turned parallel with said trucks, substantially as set forth.

6. In a vehicle gear, a frame, longitudinally extended eveners F constructed with lateral arms F' carrying wheels E and journaled in said frame, lever connections jointedly engaging said eveners toward their extremities, and a steering mechanism engaging said lever connections, substantially as described.

7. In a vehicle gear, a frame, longitudinally extended eveners journaled intermediate their ends in said frame and carrying wheels E, lever connections G, G' jointedly engaging said eveners, and a steering bar $G^2$ engaging said lever connections, substantially as described.

8. In a vehicle gear, the combination, with a pair of trucks, each having wheels pivotally secured at its ends and adapted to be turned parallel with the length of the truck, said trucks being provided with posts, springs upon the posts, and a frame above the tops of the wheels, and provided with a socket for each post, the sockets resting upon the tops of said springs, substantially as set forth.

In testimony whereof I sign this specification in the presence of two witnesses.

MATTHEW HARCOURT.

Witnesses:
 N. S. WRIGHT,
 JOHN F. MILLER.